United States Patent
Cassatt et al.

[11] Patent Number: 5,947,667
[45] Date of Patent: Sep. 7, 1999

[54] STRUCTURAL BLIND FASTENER

[75] Inventors: Gary G. Cassatt, Derby; R. Todd Briscoe, Benton, both of Kans.

[73] Assignee: The Boeing Company, Seattle, Wash.

[21] Appl. No.: 08/587,159

[22] Filed: Jan. 11, 1996

Related U.S. Application Data

[60] Provisional application No. 60/006,250, Nov. 7, 1995.

[51] Int. Cl.⁶ .......................... F16B 13/04; F16B 13/06
[52] U.S. Cl. .................. 411/34; 411/38; 411/39; 411/43; 411/54; 411/55
[58] Field of Search ................. 411/34, 38, 43, 411/55, 69, 70, 36, 37, 39, 40, 41, 42, 44, 54, 361

[56] References Cited

U.S. PATENT DOCUMENTS

| | | |
|---|---|---|
| 2,887,003 | 5/1959 | Beilmyer . |
| 2,971,425 | 2/1961 | Blakeley . |
| 3,063,329 | 11/1962 | Vaughn . |
| 3,262,353 | 7/1966 | Waeltz et al. . |
| 3,322,449 | 5/1967 | Becker . |
| 3,461,771 | 8/1969 | Briles . |
| 3,643,544 | 2/1972 | Massa . |
| 3,858,479 | 1/1975 | Sekhon . |
| 4,089,247 | 5/1978 | Dahl et al. . |
| 4,142,439 | 3/1979 | Landt . |
| 4,237,768 | 12/1980 | Volkmann . |
| 4,457,652 | 7/1984 | Pratt . |
| 4,556,351 | 12/1985 | Wollar et al. . |
| 4,569,491 | 2/1986 | Kull . |
| 4,595,324 | 6/1986 | Sadri . |
| 4,627,775 | 12/1986 | Dixon ........................ 411/38 |
| 4,659,271 | 4/1987 | Pratt et al. . |
| 4,747,202 | 5/1988 | Beals . |
| 4,772,167 | 9/1988 | Beals . |
| 4,832,548 | 5/1989 | Strobel ...................... 411/38 |
| 4,865,499 | 9/1989 | Lacey . |
| 4,877,363 | 10/1989 | Williamson et al. . |
| 4,900,205 | 2/1990 | Sadri . |
| 4,919,577 | 4/1990 | Binns . |
| 4,950,115 | 8/1990 | Sadri . |
| 4,967,463 | 11/1990 | Pratt . |
| 4,968,198 | 11/1990 | Binns . |
| 5,066,179 | 11/1991 | Pratt . |
| 5,178,502 | 1/1993 | Sadri ....................... 411/361 |
| 5,213,460 | 5/1993 | Sadri et al. ................ 411/55 |
| 5,238,342 | 8/1993 | Stencel . |
| 5,603,592 | 2/1997 | Sadri et al. ................ 411/34 |
| 5,816,761 | 10/1998 | Cassatt et al. ............. 411/34 |

*Primary Examiner*—Brian K. Green
*Assistant Examiner*—Robert G. Santos
*Attorney, Agent, or Firm*—John C. Hammar

[57] ABSTRACT

Extended fatigue endurance and high pre-load are achieved in a structural blind fastener by combining the best features of screw type and pull type blind fasteners. We replace fatigue critical details from the shear plane with close tolerance, slip fit, core bolt and outer bolt shanks to obtain the desired structural load paths while retaining anchoring features of screw type fasteners to introduce adequate pre-load. These fasteners are compatible with currently available blind bolt insertion tooling.

9 Claims, 5 Drawing Sheets

STRUCTURAL BLIND FASTENER

REFERENCE TO RELATED APPLICATION

The present application claims the benefit of U.S. Porvisional Application Ser. No. 60/006,250 entitled "Structural Blind Fastener," filed Nov. 7, 1995.

TECHNICAL FIELD

The present invention relates to a fastener for joining two or more elements in aerospace structure, and, more particularly to a structural blind fastener that can be manipulated on one side of the assembly to clamp up to a fatigue strength comparable to a solid bolt.

BACKGROUND ART

Conventional blind fasteners generally do not have the tension or shear capabilities achievable with conventional solid bolts because the blind fasteners include an internal screw, pull stem, or other detail in the shear plane to disturb the principal load carrying paths in shear or tension. Conventional solutions to achieve comparable shear and tension performance usually involve substituting exotic high strength materials, such as Inconel, for the titanium or steel alloys commonly used in fasteners for primary aerospace structure. These exotic materials introduce cost and weight penalties and may pose corrosion problems, and still have inferior fatigue endurance because of the internal threads or other features. The key factors in fatigue endurance are pre-load (clamp-up) and absence of fatiguable features in the shear plane. The clamp up force generates friction between the elements so that they resist movement. Some blind fasteners have removed details, like threads, from the shear plane, but, in doing so, have sacrificed pre-load capacity because they have removed any threaded portions from the fastener. Therefore, such blind fasteners also have inferior fatigue endurance.

The blind fastener industry today has two basic fastener types. With a screw type blind fastener, you achieve excellent pre-load using a buckling upset sleeve approach by turning a threaded core bolt in a drive nut. Fasteners of this screw type are illustrated in U.S. Pat. Nos. 4,858,479; 4,457,652; 4,579,491; 4,659,271; 4,772,167; 4,900,205; 4,919,577; 4,950,115; 4,967,463; 4,968,198; 5,066,169; and 5,238,342 which we incorporate by reference. In the screw type blind fastener, threads extend across the shear plane.

Pull type blind fasteners use a solid shank pin inside a hollow shank bolt. The shear plane may lack any fatigue critical details, like threads, but the conventional designs that rely on pulling force for pre-load provide inferior pre-load than achievable with screws or bolts. Pull type blind fasteners are described in U.S. Pat. Nos. 4,089,247; 4,142,489; and 4,865,499 which we incorporate by reference. The absence of adequate pre-load means that the joint can move too easily along the axis of the core bolt and such a joint remains prone to fatigue.

Blind fasteners have found almost no acceptance in aerospace primary structural assemblies because of their inferior fatigue endurance. In previous attempts to reduce localized stress at the thread root, fastener manufacturers have tried to improve the thread detail in the bolt body to a sinusoidal profile or to increase the wall thickness of the outer bolt to reduce field stress at the thread root. These attempts failed to increase the fatigue endurance adequately. Therefore, there remains a need for a blind structural fastener that will provide fatigue endurance comparable to a conventional bolt. The need is magnified by automated assembly processes that would greatly benefit from the ability to set fasteners with access to only one side. The present invention describes such a structural blind fastener.

SUMMARY OF THE INVENTION

The structural blind fastener of the present invention achieves comparable or better fatigue endurance to conventional aerospace bolts by combining (1) a well-controlled pre-load of high magnitude comparable to the pre-load obtainable with screw type blind fasteners with (2) elimination of fatigue critical details from the shear plane. The present fasteners permit the automated assembly of aerospace primary structure with access to only one side of the elements and with tremendous reduction in the average fastener insertion and setting time.

The present fastener removes fatigue critical details from the shear plane and replaces them with a combination of a smooth walled outer bolt and a sliding, smooth walled core bolt. The outer bolt fits snugly in the bore hole to within close tolerance while permitting slip fit insertion until a setting collar abuts the drive side element on the periphery surrounding the bore hole. The outer bolt is essentially a modified aircraft bolt having a bore drilled through the head and a taper cut onto the blind side end. The outer bolt can also be inserted into bores having interference with the bolt diameter using an impact action, such as a rivet set and gun.

The core bolt preferably is a smaller variant of an aircraft tension bolt received in the bore of the outer bolt with a close tolerance slip fit. The core bolt has a threaded portion on the drive side to allow a conventional high strength aircraft nut or collar to screw down on the drive side against the setting collar of the outer bolt to expand a setting or anchor sleeve carried on the core bolt on the back side to generate a controlled, high magnitude preload. The core bolt preferably slides in the outer bolt rather than turning. The sleeve preferably is a metal tube such as the one commonly used with the Monogram Composi-Lok® fastener. Of course, alternate designs to achieve the desired pre-load are available, including a traveling nut on the blind side. Critical in any design alternative, however, is the combination of a smooth bore through the shear plane with a screw type installation that permits high preload.

In one aspect then, the present invention relates to a method for achieving a blind structural fastener having adequate fatigue endurance for acceptance in aerospace primary structure. The method involves positioning a combination of a close tolerance slip fit outer bolt shank and inner sliding core bolt shank across the shear plane of abutting structural elements and applying adequate pre-load with blind side clamp up means (including mating threads outside the shear plane) to obtain the desired fatigue endurance. With the present invention, we can achieve fatigue endurance comparable to conventional aerospace bolts.

DETAILED DESCRIPTION OF A PREFERRED EMBODIMENT

The structural blind fastener of the present invention combines the best features of screw type and pull type blind fasteners to produce a fastener having controlled pre-load of high magnitude and superior fatigue endurance. The static and joint fatigue performance is comparable to the performance of state-of-the-art solid shank bolts. To achieve these performance goals, the structural blind fastener of the present invention removes fatigue critical details, like threads, from the shear plane while retaining means comparable to bolts that permit similar pre-load. The structural blind fastener comprises:

(a) an outer hollow (sleeve) shank bolt sized for a close tolerance slip fit with the aligned bores in the assembled structural elements;

(b) an inner core bolt sized for a close tolerance slip fit in the bore of the hollow bolt;

(c) an anchor sleeve on the blind end of the core bolt for expanding when the fastener is set to anchor the blind side (or any other suitable alternative capable of providing the necessary pre-load); and (d) a conventional self-locking, high strength, aircraft drive nut mating on matching threads at the drive end of the core bolt.

The drive nut turns to pull the core bolt inward from the back side to buckle or expand the anchor sleeve on the blind side while imposing the desired pre-load to the joint. Either protruding or countersunk fasteners are easy to prepare, as appropriate. In this preferred fastener the threads on the drive end of the core bolt are outside the shear plane and are removed from the high bending moment which characterizes aerospace structural joints.

We believe that a solid shank pin on the core bolt in combination with the hollow shank bolt sized for a close tolerance slip fit (or slight interference fit) with the bore produces the improved fatigue endurance. Our tests show that the structural blind fastener has comparable or better fatigue endurance than a conventional solid bolt, such as a Hi-Lok® shear bolt.

Figure 1:
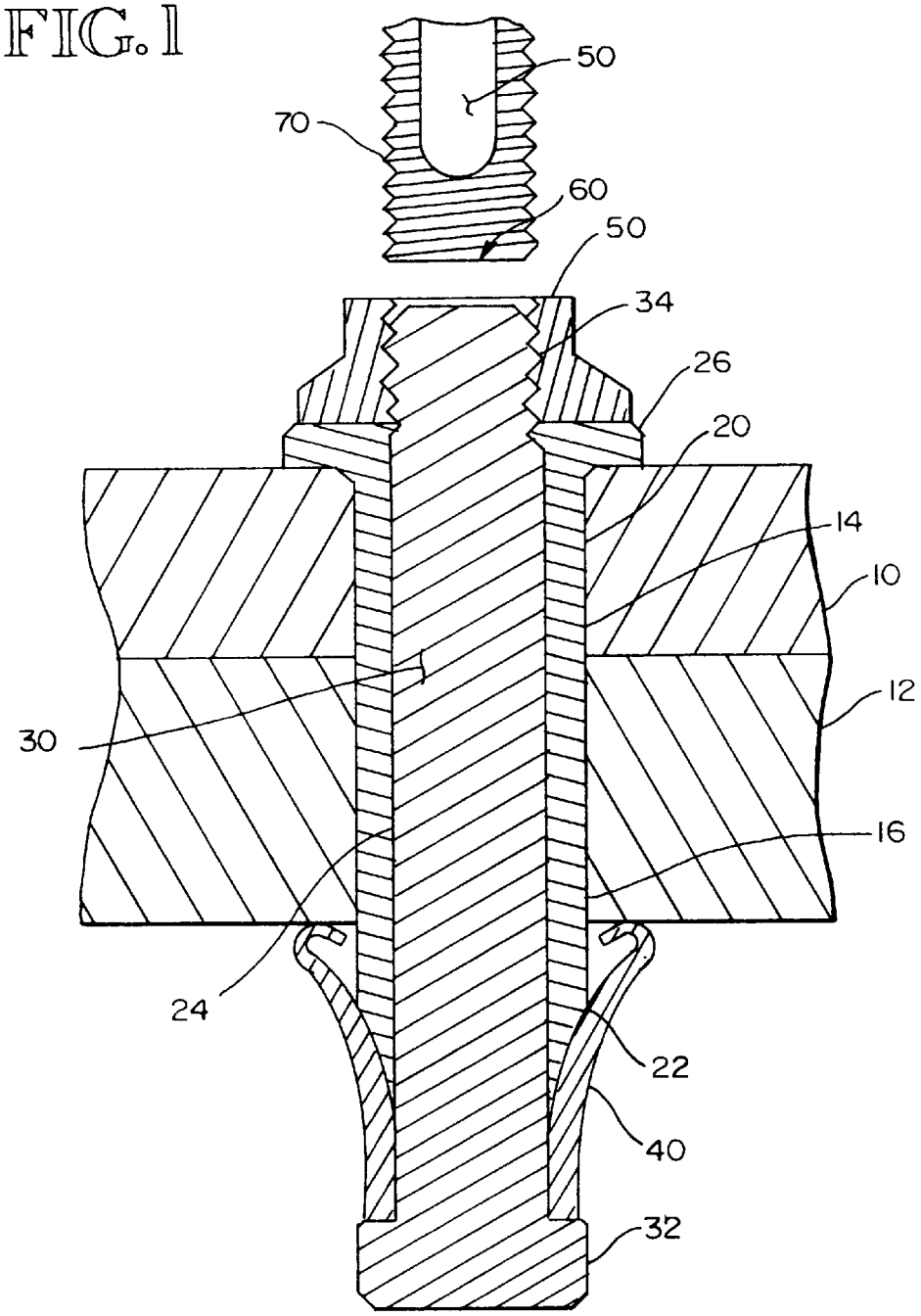
FIG. 1 is a schematic sectional view of a joint using a preferred blindside structural fastener of the present invention.

As shown in FIG. 1, two structural elements 10 and 12 are assembled in abutting fashion so that bores 14 and 16 align to define a bore hole having a drive side and a blind or back side. Typically the structural elements 10 and 12 may be components of an engine strut for a transport airplane where they would typically be aluminum or titanium alloy or an aluminum, titanium, steel combination. Typical assemblies include aluminum web to titanium spar chords or aluminum web to titanium understructure in strut upper spar assemblies or titanium skin to steel spar, titanium skin to titanium and aluminum understructure, or titanium skin to titanium upper spar chords in strut side skin assemblies, or similar applications. The bore hole is filled with a hollow outer bolt 20 and a core bolt 30 sized to fit snugly in the bore of the outer bolt 20 with a close tolerance slip fit. The smooth walls of the outer bolt and the core bolt in the portion aligned with the shear plane eliminate any fatigue critical details in the shear plane, so the fastener functions similarly to a solid shank bolt. The outer bolt is usually steel or titanium while the core bolt may be steel or titanium.

We can make the outer shank bolt 20 from a modified aircraft quality bolt of the proper dimension by cutting a taper 22 on the blind end of the outer bolt 20. Then, we bore a close tolerance hole 24 down the center of the outer bolt 20 to accommodate the core bolt 30. On the drive end, the outer bolt includes a seating collar 26 of dimension greater than the bore hole for retaining the outer bolt on the drive side and usually having wrench flats. The collar 26 in FIG. 1 is a protruding head, but a countersunk collar of conventional bolt design might readily be substituted, as those of ordinary skill will understand.

The core bolt 30 uses existing blind fastener technology. In the shear plane, the core bolt has a shank that is smooth (matching the bore of the outer bolt 20) and sized for a close tolerance slip fit. The blind end of the core bolt 30 has an enlarged "Tee" head 32 for retaining an anchor sleeve 40 during pull-up where the sleeve 40 buckles or expands to anchor the fastener with high pre-load. The buckled anchor sleeve 40 and "Tee" head 32 together functionally constitute the equivalent of a nut on the blind side. This preferred anchor assembly is comparable to the Monogram Composi-Lok® anchor. Accordingly, other anchoring means can be substituted while retaining the described function. For example, a traveling nut might mate with matching threads on the end of the core bolt to impart the buckling force on the anchor sleeve 40. The anchor sleeve 40 is sized so that it fits snugly around the core bolt 30 above the taper 22 of the shank bolt 20 to allow easy installation. During setting, the core bolt 30 usually does not rotate. Instead, it slides inwardly in the bore of the shank bolt 20.

On the drive end of the core bolt 30, threads 34 allow a drive nut 50 to pull the core bolt 30 through the bore of the shank bolt 20 to buckle the anchor sleeve 40 to set the fastener. We usually include a wrench flat 55 to hold the core bolt 30 against rotation when we turn the drive nut 50 so that we obtain the necessary pulling force to produce the desired pre-load. A necked-clown section 60 of the core bolt 30 allows us to break off the drive stem 70 by applying a torsional overload after bolt setting. The break usually occurs flush with the drive nut or slightly inside the nut. U.S. Pat. No. 4,659,271 describes such a drive stem.

During installation, we can hold the nut 50 motionless while turning the core bolt 30 or vice versa. If we drive the nut, after installation and twist off of the core bolt stem, we have the option of replacing the draw nut with a conventional self-locking aircraft nut. If we drive the core bolt, the draw nut can be a self-locking nut to start with, and we can leave it undisturbed.

We usually include a conventional insert tube between the core bolt shank and anchor sleeve to ensure that the anchor sleeve buckles outwardly properly.

Unlike conventional blind fasteners, we can easily remove our structural blind fastener by removing the drive nut, removing the core bolt (by pushing it to the blind side or by tapping, if necessary), and pulling the outer bolt. In many circumstances, the blind structural fastener elements may be reusable if a new anchor sleeve is used.

Figure 2:
FIG. 2 is a representative photomicrophraph illustrating fatigue cracking in threads of a prior art fastener after only 10,000 test cycles.
Figure 5:
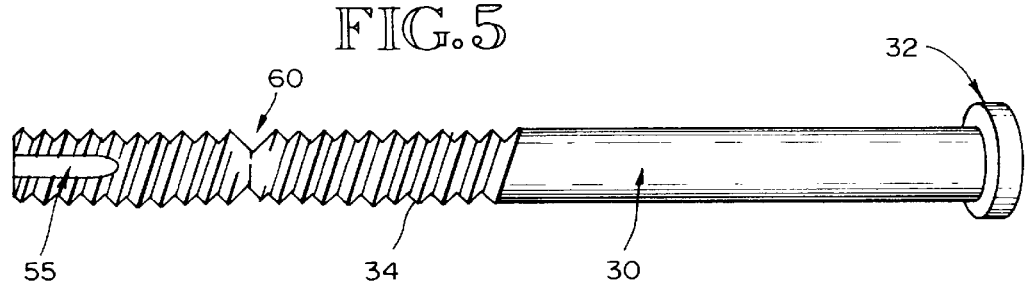
FIG. 5 is a schematic elevation of our preferred core bolt.

FIG. 2 shows a conventional threaded blind fastener with serious fatigue cracks following about 10,000 cycles in simulated lifetime testing. Cracks of the type shown are the primary reason that conventional blind fasteners are unacceptable for aerospace primary structural applications.

Figure 3:
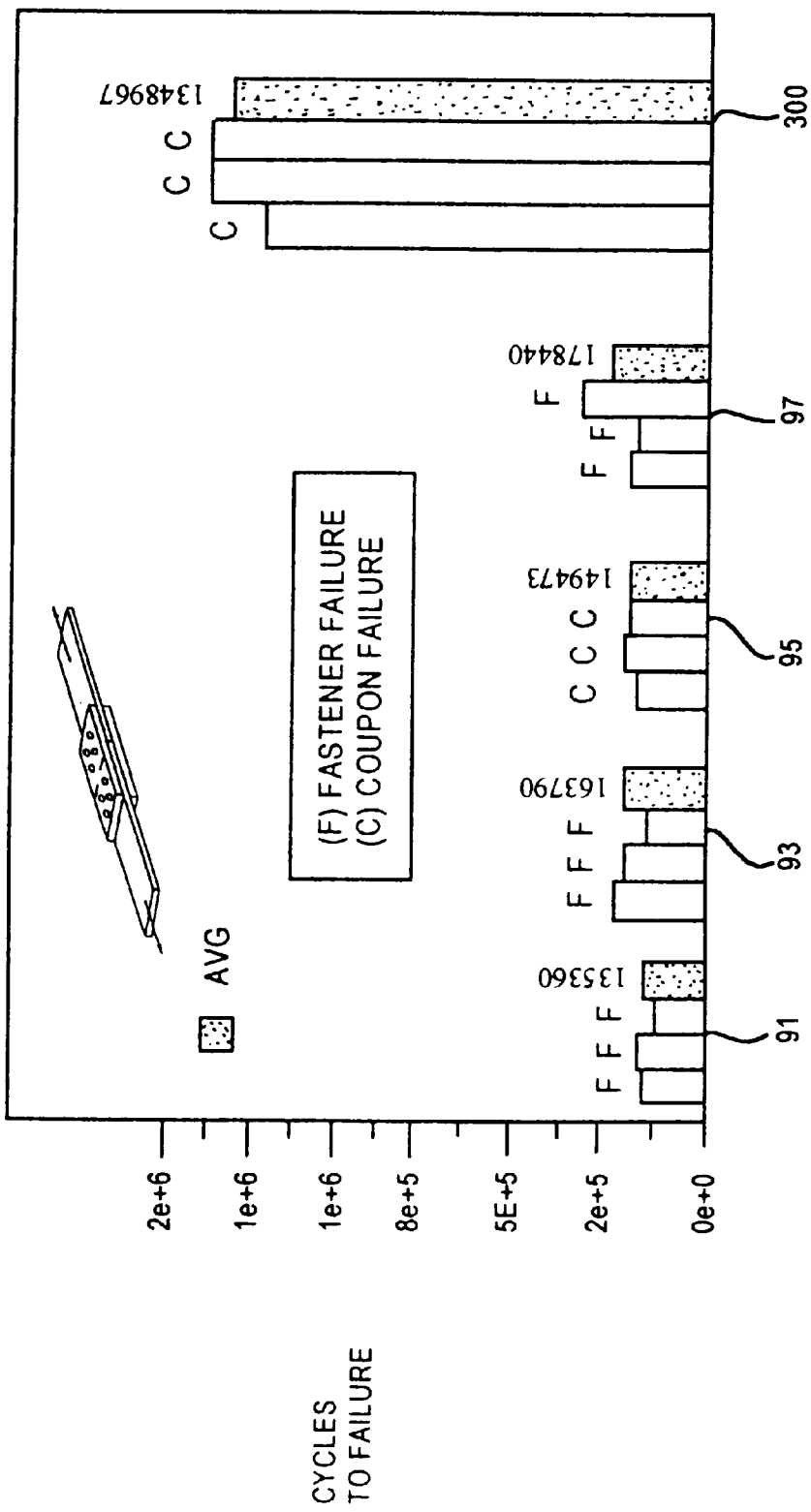
FIG. 3 is a bar chart of shear joints to failure showing the improved fatigue endurance of fasteners of the present invention compared with prior art blind fasteners test results.
Figure 4:
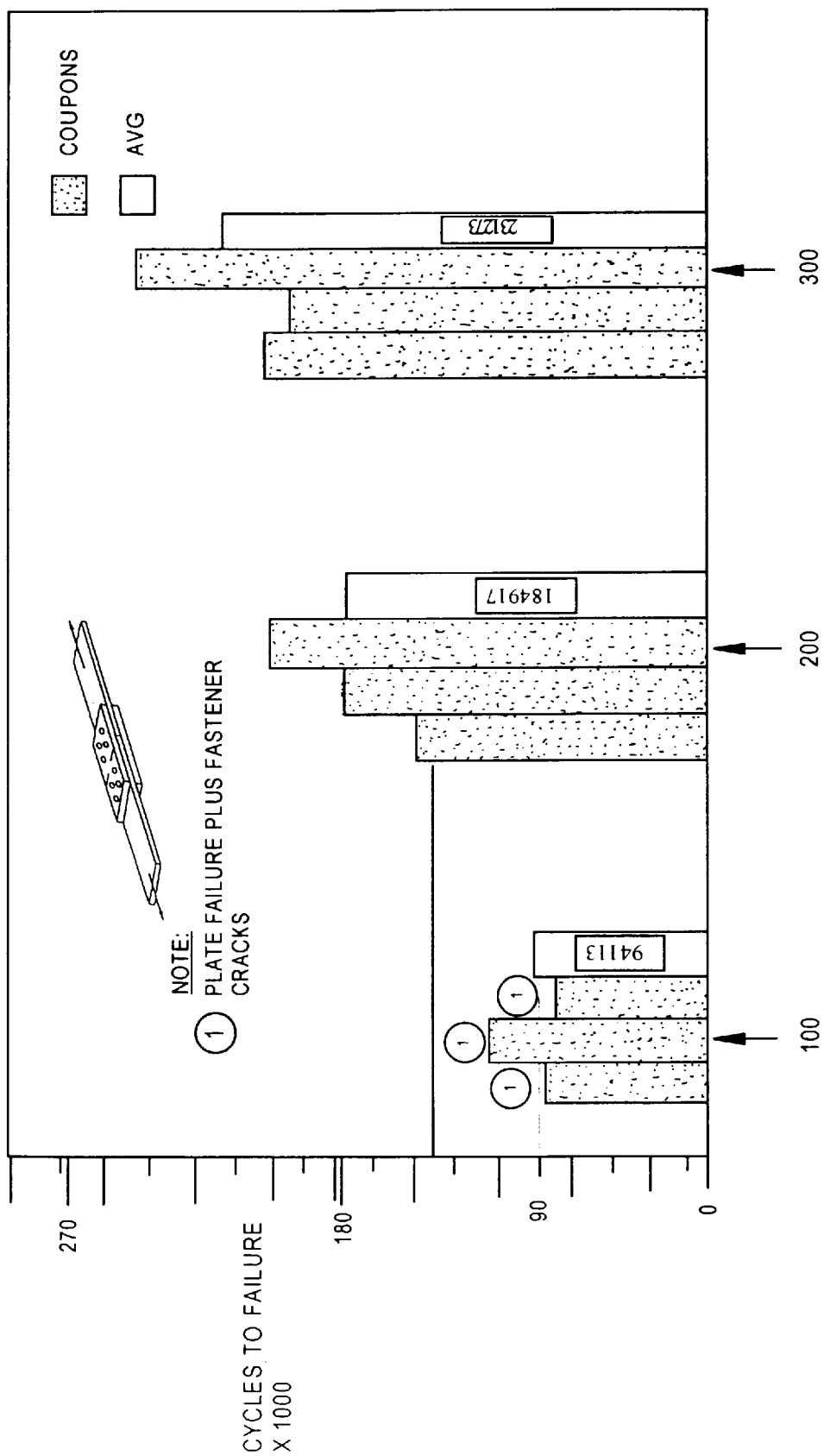
FIG. 4 is another bar chart showing the extended fatigue endurance we measured for the fasteners of the present invention compared with prior art, screw type blind fasteners and prior art, solid aircraft bolts.

FIGS. 3 and 4 show fatigue endurance tests for structural blind fasteners of the present invention in comparison to prior art fasteners. The bar charts show significant fatigue endurance improvement. The test data in FIG. 3 are for screw type fasteners 91, 93, 95, and 97 compared with our fasteners 300. In these tests, we achieved superior performance, but never learned the limits of our fasteners since the coupons failed prior to the fasteners, as shown by the "(C)" above the bars. The test data in FIG. 4 are for a screw type blind fastener 100, a solid shank aircraft bolt 200, and our fasteners 300, respectively, in reversing loaded, double shear specimen tests in 2024-T351 aluminum plates at 12 ksi axial tension, R=−1 for nominal 0.25 inch diameter steel fasteners using a fastened coupon as schematically illustrated in FIGS. 3 and 4.

Our blind structural fastener uses proven technology to achieve adequate pre-load while minimizing shear plane compromise without increasing the likelihood of fatigue failures over competing conventional designs. As a bonus, the fastener is easily removed with most parts being reusable. Most important, the joint fatigue strength and fatigue endurance is comparable to a solid bolt.

Our structural blind fastener still functions properly when installed into undersized bores which result in up to about 0.003 inches of interference, because of the relatively thick outer wall of the outer shank bolt. Prior art fasteners struggle with undersized, interference bores of this type and they can only be used in limited circumstances and then, with relatively unpredictable installation reliability/confidence. Our structural blind fastener offers a synergistic design using a smooth bore, thick outer body that is undisturbed by interference fit applications. Screw-type fasteners usually bind because of their threads in such interference bores necessitating rework to redrill the bore. Our fastener also retains the pre-load clamp up features of screw type fasteners and removes all fatigue critical details from the working portion of the fastener (i.e., from the shear plane where loads are transferred). This unique combination provides structural performance and fatigue endurance comparable to solid shank aircraft bolts while retaining the installation and automation advantages of blind fasteners.

The fastener construction and alloys are otherwise in keeping with conventional designs and practices of the art as illustrated in the patents we earlier incorporated by reference.

Our fasteners function well with up to about 2° off-axis bores and with back side relief angles of up to 7 degrees.

The structural blind fastener is designed to match or exceed the performance of a shear head aircraft bolt. Accordingly, it should have a shear strength measured according to MIL-STD-1312, test 13, of at least about 95 ksi for a 0.25 inch fastener and a tension strength measured according to MIL-STD-1312, test 8, comparable to a shear Hi-Lok® bolt. We measure pre-load according to MIL-STD-1312, test 16, with a goal of 50% of $F_{tu}$ of the core bolt capability. The minimum pre-load for 0.25 inch shear fasteners is 1500 lbs., but we prefer fasteners with pre-load exceeding 2500 lbs. Generally the pre-load for our structural blind fasteners is in the range of about 2300–2800 lbs. For 5/16 inch structural blind fasteners, our minimum pre-load is 2500 lbs and preferred pre-load is in excess of 4000 lbs. with a typical range of about 4100–4450 lbs.

FIGS. 3 and 4 graphically illustrate the test performance we have achieved with our structural blind fastener. In FIG. 3, we compare the joint strength of a test coupon for our fastener 300 (the far right column) against conventional and improved design Composi-Lok® blind fasteners 91, 93, 95, and 97. We achieved outstanding performance far exceeding the Composi-Loks®. Failure resulted from coupon cracking rather than fastener cracking, so our fastener performed as well as the test structure would allow.

In FIG. 4, we illustrate similar test results for our fastener 300 against a screw-type blind bolt 100 and a solid shank aircraft bolt 200. Our fasteners performed better than the aircraft bolts and had over twice the endurance before failure (and, preferably, 2.5 times the fatigue endurance) than the prior art blind fastener. The blind bolt 100 failed at about 94,000 cycles and inspection revealed numerous fastener cracks which would render the fasteners unacceptable in this primary structure application. The solid bolts 200 failed at about 185,000 from coupon failures. Our blind fasteners 300 lasted an average of 231,000 cycles with failures resulting from coupon failure rather than fastener cracking. We believe that our fasteners outperformed the bolts 200 because of higher clamp-up (pre-load) and outperformed the blind fasteners 100 because of both higher pre-load and elimination of fatigue critical details.

Our structural blind fastener performs other critical structural tests as well or better than conventional solid shank aircraft bolts including tests for tension fatigue, vibration, single lap shear, low load/high load joint fatigue, locking torque, and sheet pull-up (typically measured in accordance with the corresponding MIL-STD-1312 test). These outstanding structural characteristics make our blind fastener acceptable and attractive for automated assembly operations using conventional and available bolt insertion tooling. We can reduce fastener installation to about 25–33% of the time presently required for solid, two-piece bolt installations.

Our fastener also reduces assembly damage during installation because it eliminates blind side nut tools and improves mating surface contact through higher clamp-up forces (pre-load). With controlled installation torque, we reduce assembly variation from fastener to fastener. Our assembled products are better and cheaper to manufacture, although there is a slight weight penalty imposed with a blind fastener over a solid shank bolt.

Figure 6:
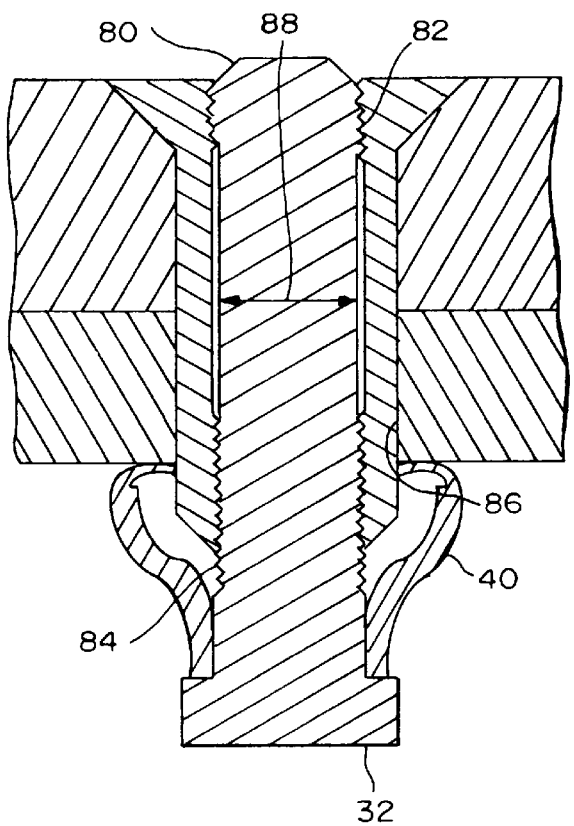
FIG. 6 is a schematic sectional view of a fastener design alternative using threaded portions on each end of the core bolt while eliminating threads in the shear plane.

As an optional approach, as shown in FIG. 6, the c(ore bolt 80 might include threads 82 and 84 only at the top and bottom to mate with matching threads on the outer bolt 86 outside the shear plane, as shown by reference 88. In this design, the core bolt 80 turns during installation (i.e., during fastener setting to expand the blind side anchor 40). While FIG. 6 shows threads at both the top (head) and bottom (blind end), other designs might limit the threaded portions to only the top or only the bottom rather than both while still leaving the shear plane free of threads or other fatigue critical details.

Figure 7:
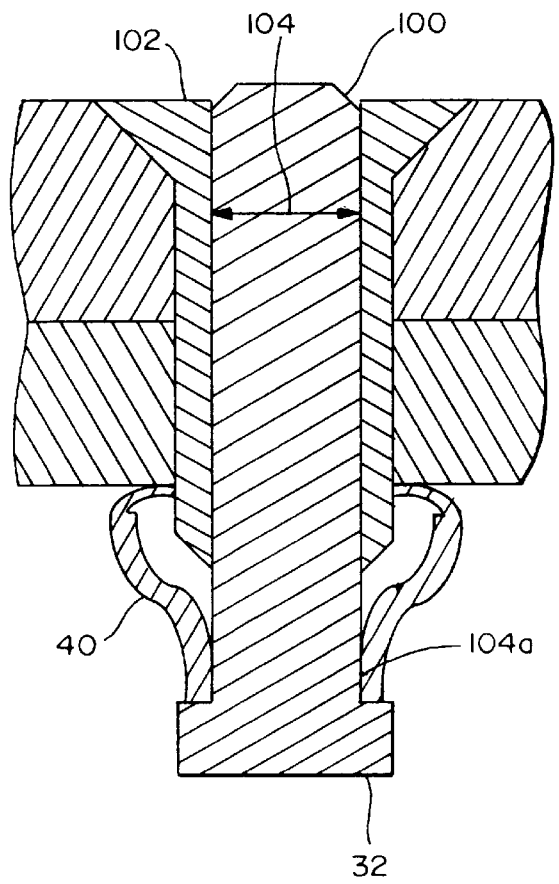
FIG. 7 is another schematic sectional view of a fastener design alternative using post-insertion brazing to eliminate threads entirely from the fastener.

The alternative of FIG. 7 eliminates threads and substitutes brazing of the core bolt and outer bolt after the pull process to install the fastener. The smooth core bolt 100 slides within the smooth bore of the outer bolt 102. The core bolt-outer bolt interface is coated with a suitable braze alloy or solder 104, such as electroplated aluminum solder on a titanium core bolt or bronze braze alloy on a steel core bolt. Braze alloy 104a might also be used between the anchor sleeve 40 and core bolt adjacent the Tee head 32.

With the fastener installed and pulled up to the desired pre-load as shown in FIG. 7, we heat the fastener bolts to fuse the braze alloy/solder to diffuse the braze alloy into the adjacent surfaces of the core bolt 100 and outer bolt 102 to leave a solid shank. In the same way, brazing can occur between the core bolt 100 and anchor sleeve 40.

While we have described preferred embodiments, those skilled in the art will readily recognize alterations, variations, and modifications which might be made without departing from the inventive concept. Therefore, interpret the claims liberally with the support of the full range of equivalents known to those of ordinary skill based upon this description. The examples are given to illustrate the invention and are not intended to limit it. Accordingly, limit the claims only as necessary in view of the pertinent prior art.

We claim:

1. A method for stabilizing a shear plane in an aerospace structural lap joint assembly comprising at least two structural elements, each element having a widths, the elements being joined with at least one bolt, wherein the shear plane is defined by the combined widths of the elements and the interface of the two elements to extend the fatigue life of the joint because the at least one bolt has joint fatigue strength comparable to the fatigue strength of a conventional solid bolt, the method comprising the steps of:

(a) aligning corresponding bores in the two elements to define a bore hole crossing the shear plane having a drive side element and a blind side element;

(b) inserting a core bolt within a hollow portion of an outer bolt to form an outer bolt/core bolt combination in which the combination fills the hollow with a thread-free, detail-free, smooth interface in substantially the entire shear plane;

(c) from the drive side only, inserting the outer bolt and the core bolt combination into the bore hole to contact the walls of the bores with a smooth bolt surface free of threads or other details across substantially the entire shear plane, the outer bolt being stopped in position by a drive-side collar that has an outside diameter larger than the bore hole so that the drive-side collar seats against the drive side element; and (d) from the drive side only, setting the core bolt on the blind side to clamp up the joint by drawing the core bolt toward the drive side within the outer bolt to compress an anchor sleeve around the core bolt on the blind side to cause the sleeve to buckle and to expand between a head of the core bolt and the blind side element while securing a core collar on the drive side against the drive-side collar of the outer hollow bolt by engaging threads on the core collar with corresponding threads on a threaded drive end of the core bolt to obtain a pre-load comparable to a solid shank bolt of at least 1,500 lbs according to MIL-STD 1312, TEST 16.

2. The method of claim 1 wherein the outer bolt and bore hole have an interference of up to about 0.003 inches.

3. The method of claim 1 wherein the pre-load is at least 2500 lbs.

4. A blind structural bolt assembly comprising a bolt joining at least a drive side structural element and a blind side structural element to provide a lap joint having a fatigue strength comparable to a lap joint formed using a conventional solid bolt, each structural element having a width and the fatigue strength arising from removal of threads or other details commonly used in conventional blind fasteners in the shear plane defined by the combined widths of the structural elements and the interface at aligned bores on the abutting structural elements, the bolt assembly comprising:

(a) a hollow outer bolt having a smooth outer surface free from fatigue details in the shear plane to fit snugly within the aligned bores across the shear plane, a concentric longitudinal, smooth, central bore for receiving a core bolt, and a seating collar near one end for seating against the drive side element;

(b) a core bolt slip fit within the central bore of the outer bolt with a smooth shank to match the outer bolt in a close fit between the core bolt and the outer bolt in the shear plane so that the installed bolt is thread-free and detail-free across substantially the entire shear plane; and (c) means for pre-loading the core bolt and outer bolt combination to achieve a fatigue strength for the blind structural bolt comparable to a conventional smooth solid shank bolt, the pre-loading means allowing driving the core bolt from only the drive side while creating a clamping fixture by expanding and bulging an anchor sleeve around the core bolt on the blind side to anchor the bolt against the blind side element to provide a pre-load of at least 2300 lbs according to MIL-STD-1312, test 16 so that the set bolt has an endurance at least comparable to a conventional, solid bolt of comparable size.

5. The assembly of claim 4 wherein the pre-loading means includes mating threads on the core bolt and on a nut on the drive side that abuts the seating collar of the outer bolt when the bolt is set.

6. The assembly of claim 5 wherein the anchor sleeve is slip fit on the core bolt, the core bolt having a tee head without an expanding sleeve, the tee head of the core bolt passing through the bores to the blind side, wherein the anchor sleeve buckles to protrude beyond the diameter of the bore between the tee head and the blind side element when the bolt is set.

7. The assembly of claim 5 wherein the pre-load exceeds 4000 lbs.

8. A structural lap joint between at least two elements fastened with a blind side structural fastener assembly as defined in claim 4, the joint having sufficient pre-load to provide an average endurance for the joint of about 231,000 cycles.

9. The assembly of claim 4 wherein the core bolt and the outer bolt are steel or titanium.

* * * * *